US012525179B1

(12) United States Patent
Liao et al.

(10) Patent No.: US 12,525,179 B1
(45) Date of Patent: Jan. 13, 2026

(54) PIXEL CIRCUIT AND DISPLAY PANEL

(71) Applicant: PlayNitride Display Co., Ltd., MiaoLi County (TW)

(72) Inventors: Kuan-Yung Liao, MiaoLi County (TW); Cheng-Chi Lo, MiaoLi County (TW); Yun-Li Li, MiaoLi County (TW); Yen-Jen Lai, MiaoLi County (TW)

(73) Assignee: PlayNitride Display Co., Ltd., MiaoLi County (TW)

( * ) Notice: Subject to any disclaimer, the term of this patent is extended or adjusted under 35 U.S.C. 154(b) by 0 days.

(21) Appl. No.: 19/044,636

(22) Filed: Feb. 4, 2025

(30) Foreign Application Priority Data

Dec. 19, 2024 (TW) ................................ 113149564

(51) Int. Cl.
*G09G 3/32* (2016.01)

(52) U.S. Cl.
CPC ....... *G09G 3/32* (2013.01); *G09G 2300/0814* (2013.01); *G09G 2330/028* (2013.01); *G09G 2360/148* (2013.01)

(58) Field of Classification Search
CPC ............. G09G 3/32; G09G 2300/0814; G09G 2330/028; G09G 2360/148
See application file for complete search history.

(56) References Cited

U.S. PATENT DOCUMENTS

| | | | | |
|---|---|---|---|---|
| 2008/0186263 | A1* | 8/2008 | Lee | G09G 3/3225 345/82 |
| 2011/0164011 | A1* | 7/2011 | Yamamoto | G09G 3/3233 345/207 |
| 2020/0119061 | A1* | 4/2020 | Oh | H10K 59/60 |
| 2021/0027711 | A1 | 1/2021 | Qin et al. | |

FOREIGN PATENT DOCUMENTS

TW 202420051 A 5/2024

OTHER PUBLICATIONS

"Office Action of Taiwan counterpart Application", issued on Nov. 7, 2025, p. 1-p. 9.

* cited by examiner

*Primary Examiner* — Andrew Sasinowski
(74) *Attorney, Agent, or Firm* — JCIPRNET

(57) ABSTRACT

A pixel circuit and a display panel are provided. The pixel circuit includes a driving circuit, a selection circuit, a light-emitting element, and a signal processor. The driving circuit is controlled by a data signal. The selection circuit is turned on or off according to a mode of the pixel circuit. In a light-sensing mode, the light-emitting element generates a sensing signal by sensing a luminance of a light signal. The signal processor generates light sensing information according to the sensing signal and a reference voltage.

19 Claims, 11 Drawing Sheets

PIXEL CIRCUIT AND DISPLAY PANEL

CROSS-REFERENCE TO RELATED APPLICATION

This application claims the priority benefit of Taiwan application serial no. 113149564, filed on Dec. 19, 2024. The entirety of the above-mentioned patent application is hereby incorporated by reference herein and made a part of this specification.

BACKGROUND OF THE INVENTION

Field of the Invention

The invention relates to a pixel circuit and a display panel, and in particular to a pixel circuit and a display panel that may improve display quality.

Description of Related Art

In an electronic presentation system, the presentation content is displayed via a display panel, and the presenter may send a light signal to the display panel via a laser pen to guide the participants on the content to be explained.

In prior art, a display panel generally has a relatively low light reflectivity. Therefore, when a light signal is emitted to the display panel via the laser pen, the laser pen may not generate a clear light spot on the display panel, causing difficulty for the participants to watch.

SUMMARY OF THE INVENTION

The invention provides a pixel circuit and a display panel that may perform picture display and light signal detection.

A pixel circuit of the invention includes a driving circuit, a selection circuit, a light-emitting element, and a signal processor. The driving circuit is coupled to a power supply voltage and controlled by a data signal. The selection circuit is turned on or off according to a mode of the pixel circuit. The light-emitting element is coupled between the driving circuit and the selection circuit, and generates a sensing signal by sensing a luminance of a light signal in a light-sensing mode. The signal processor is coupled to the light-emitting element and generates light sensing information according to the sensing signal and a reference voltage.

A display panel of the invention includes a plurality of the pixel circuit above. The pixel circuits are arranged as a pixel array.

Based on the above, the pixel circuit of the invention may be operated in a display mode and a light-sensing mode. In the light-sensing mode, the light-emitting element generates a sensing signal by sensing the luminance of the light signal. The signal processor may generate light sensing information according to the sensing signal and a reference voltage. Thus, the display panel of the invention may receive a light signal to input information, and accordingly adjust the display luminance of the corresponding area to improve display quality.

DESCRIPTION OF THE EMBODIMENTS

Figure 1:
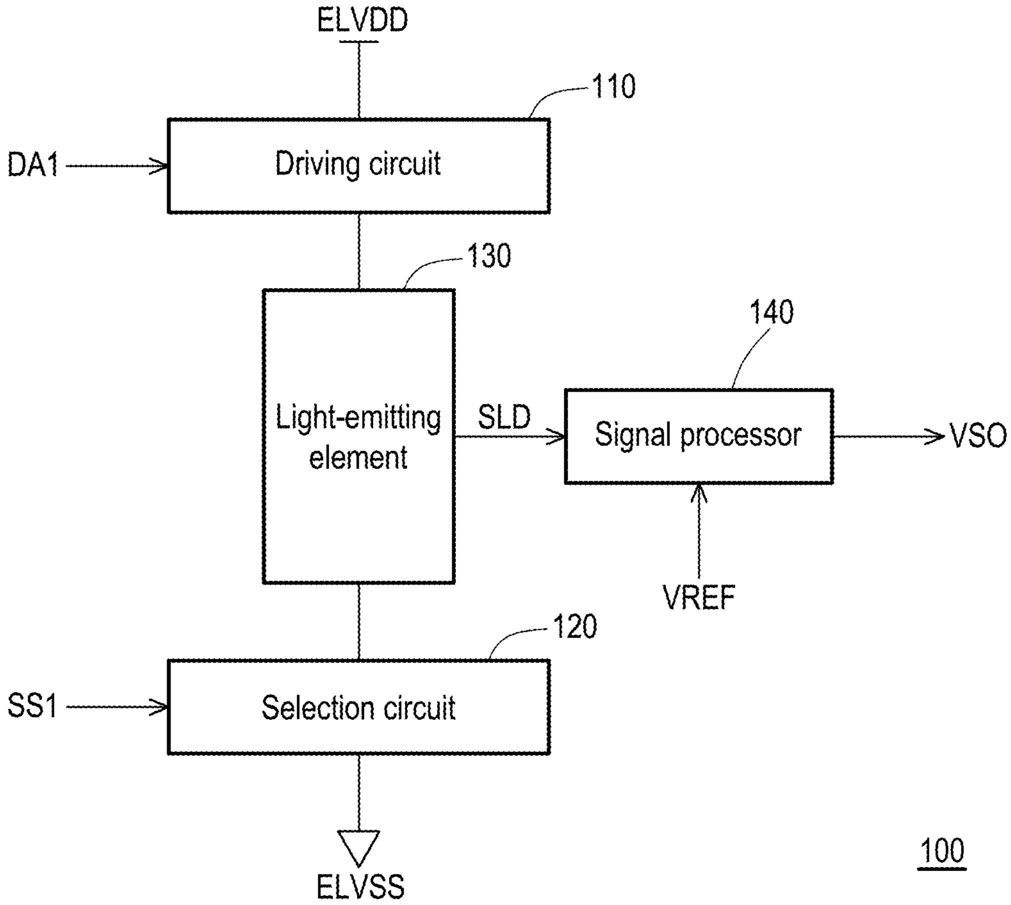
FIG. 1 shows a schematic diagram of a pixel circuit of an embodiment of the invention.

Referring to FIG. 1, FIG. 1 shows a schematic diagram of a pixel circuit of an embodiment of the invention. A pixel circuit 100 includes a driving circuit 110, a selection circuit 120, a light-emitting element 130, and a signal processor 140. The driving circuit 110 is coupled to a power supply voltage ELVDD and controlled by a data signal DA1. The driving circuit 110 may receive the data signal DA1 according to a scan signal, and turn the connection state between the light-emitting element 110 and the power supply voltage ELVDD on or off according to the data signal DA1.

The selection circuit 120 is coupled between the light-emitting element 130 and a reference ground voltage ELVSS. The selection circuit 120 turns the connection state between the light-emitting element 130 and the reference ground voltage ELVSS on or off according to the operation mode of the pixel circuit 100. In particular, in the present embodiment, the operation mode of the pixel circuit 100 includes a light-sensing mode and a light-emitting mode. In the light-sensing mode, the selection circuit 120 may turn off the connection state between the light-emitting element 130 and the reference ground voltage ELVSS according to a selection signal SS1. In the light-emitting mode, the selection circuit 120 may turn on the connection state between the light-emitting element 130 and the reference ground voltage ELVSS according to the selection signal SS1.

The light-emitting element 130 is coupled between the driving circuit 110 and the selection circuit 120. The light-emitting element 130 generates a display light beam in the display mode. The light-emitting element 130 is used to sense an external light signal in the light-sensing mode, and generate a sensing signal SLD according to the intensity of the sensed light signal.

The signal processor 140 is coupled to the light-emitting element 130. The signal processor 140 generates light sensing information VSO according to the sensing signal SLD and a reference voltage VREF.

Figure 2:
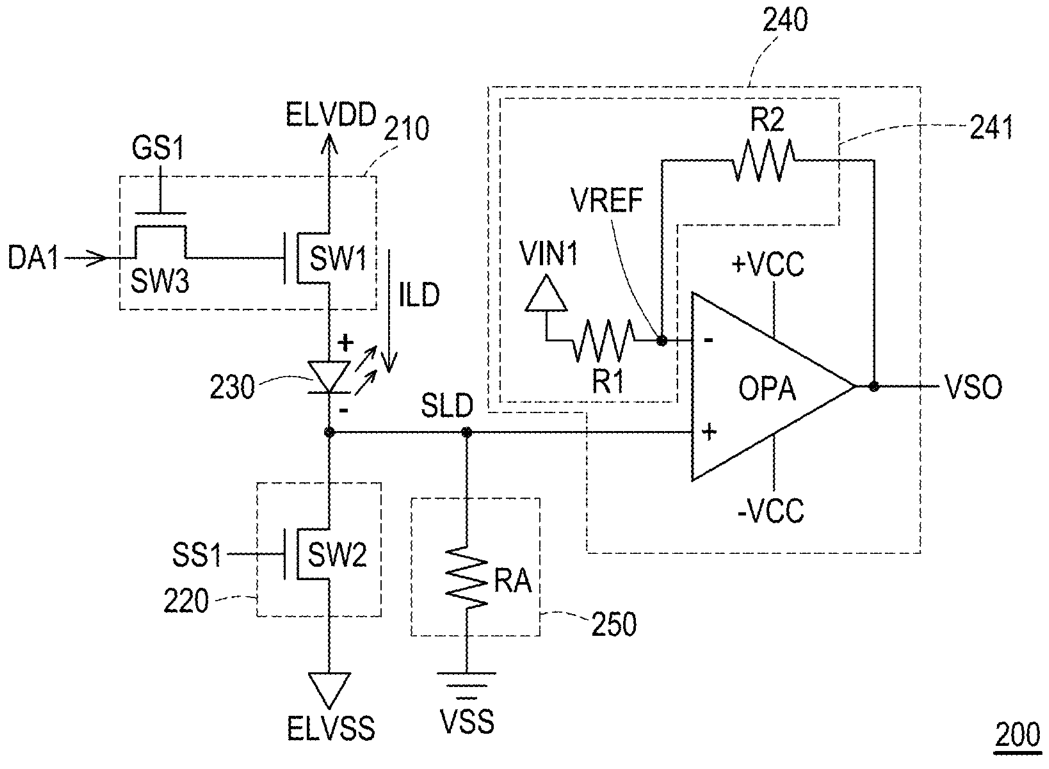
FIG. 2 shows a schematic diagram of a pixel circuit of another embodiment of the invention.

Referring to FIG. 2 below, FIG. 2 shows a schematic diagram of a pixel circuit of another embodiment of the invention. A pixel circuit 200 includes a driving circuit 210, a selection circuit 220, a light-emitting element 230, a signal processor 240, and a current-to-voltage converter 250. In the present embodiment, the driving circuit 210 is coupled to the anode of the light-emitting element 230. The driving circuit 210 includes switches SW1 and SW3. The switches SW1 and SW3 are both transistor switches, wherein the switch SW1 is coupled between the power supply voltage ELVDD and the light-emitting element 230, and the control terminal of the switch SW1 is coupled to one end of the switch SW3. Another end of the switch SW3 receives the data signal DA1, and the control terminal of the switch SW3 receives a scan signal GS1. The switch SW3 may be turned on or off according to the scan signal GS1. When the switch SW3 is turned on, the data signal DA1 may be transmitted to the control terminal of the switch SW1 via the switch SW3. In the light-emitting mode, the data signal DA1 corresponds to the display grayscale value and controls the light-emitting element 230 to receive the corresponding driving current to generate the corresponding luminance. In the light-sensing mode, the data signal DA1 may drive the switch SW1 to be turned on and provide a current loop of the light-emitting element 230.

The selection circuit 220 includes a switch SW2. The switch SW2 may also be a transistor switch. The switch SW2 is coupled between the light-emitting element 230 and the reference ground voltage ELVSS, and controlled by the selection signal SS1. The switch SW2 may be turned on in the light-emitting mode and turned off in the light-sensing mode.

In the present embodiment, the light-emitting element 230 may be a micro light-emitting diode, and the maximum width thereof is between 1 micrometer and 50 micrometers. Micron-sized light-emitting diodes may be densely integrated into display pixels. In particular, the anode of the light-emitting element 230 is coupled to the switch SW1, and the cathode of the light-emitting element 230 is coupled to the switch SW2. In particular, in the light-emitting mode, via the turned-on switches SW1 to SW3, the light-emitting element 230 may generate a display light beam based on the display grayscale value corresponding to the data signal DA1. In the light-sensing mode, the light-emitting element 230 may receive an external light signal and generate a sensing signal ILD by sensing the light intensity of the light signal. In the present embodiment, the sensing signal ILD may be a current signal.

The current-to-voltage converter 250 is coupled to the cathode of the light-emitting element 230 and also coupled to the reference ground terminal VSS. The current-to-voltage converter 250 may receive the sensing signal ILD as a current signal, and convert the sensing signal ILD into the sensing signal SLD as a voltage signal. The current-to-voltage converter 250 is a resistor RA. In particular, the sensing signal ILD flows through the resistor RA and generates the sensing signal SLD at a coupling node of the resistor RA and the light-emitting element 230.

In the present embodiment, the reference ground voltages ELVSS and VSS may have the same or different voltage values.

In the present embodiment, the signal processor 240 is coupled to the cathode of the light-emitting element 230 to receive the sensing signal SLD. The signal processor 240 includes an operational amplifier OPA and a feedback circuit 241. The positive input terminal of the operational amplifier OPA receives the sensing signal SLD; the negative input terminal of the operational amplifier OPA receives the reference voltage VREF generated by the feedback circuit 241. In particular, the feedback circuit 241 includes resistors R1 and R2 coupled in series. The resistor R1 is coupled between an input voltage VIN1 and the negative input terminal of the operational amplifier OPA, and the resistor R2 is coupled between the resistor R1 and the output terminal of the operational amplifier OPA. The resistors R1 and R2 may generate the reference voltage VREF at the negative input terminal of the operational amplifier OPA according to the input voltage VIN and the output voltage of the operational amplifier OPA. The signal processor 240 is used for amplifying the sensing signal SLD to generate the light sensing information VSO.

Incidentally, the operational amplifier OPA receives a power supply voltage +VCC as a positive voltage and a power supply voltage −VCC as a negative voltage as the operating power supply. In the present embodiment, the voltage value of the light sensing information VSO may be between the power supply voltages +VCC and −VCC. In addition, the switches SW1 to SW3 in the present embodiment may be constructed using any different types of transistors without any specific limitation.

Figure 3:
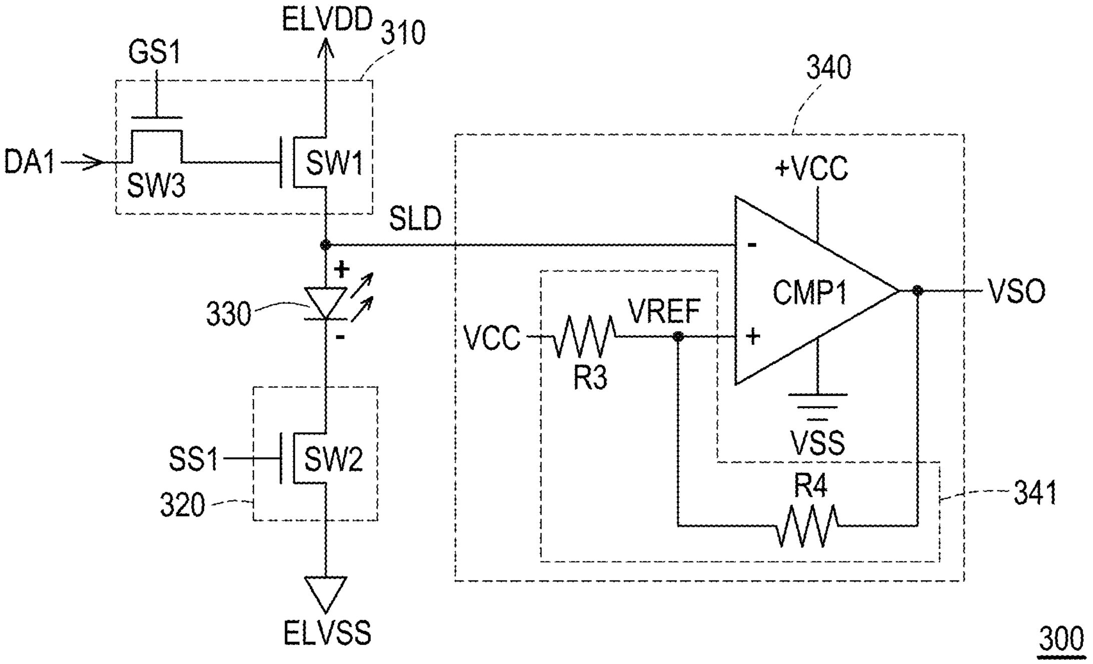
FIG. 3 shows a schematic diagram of a pixel circuit of another embodiment of the invention.

Referring to FIG. 3 below, FIG. 3 shows a schematic diagram of a pixel circuit of another embodiment of the invention. A pixel circuit 300 includes a driving circuit 310, a selection circuit 320, a light-emitting element 330, and a signal processor 340. In the present embodiment, the driving circuit 310 includes the switches SW1 and SW3, and the selection circuit 320 includes the switch SW2. The driving circuit 310, the selection circuit 320, and the light-emitting element 330 have the same circuit configuration as the driving circuit 210, the selection circuit 220, and the light-emitting element 230 of the embodiment of FIG. 2, and thus are not described again.

Different from the above embodiments, in the present embodiment, in the light-sensing mode, the light-emitting element 330 may generate the sensing signal SLD in the form of a voltage at the anode thereof by sensing the intensity of an external light signal. The signal processor 340 is coupled to the cathode of the light-emitting element 330 and receives the sensing signal SLD. The signal processor 340 includes a comparator CMP1 and a reference voltage generator 341. The negative input terminal of the comparator CMP1 may be coupled to the cathode of the light-emitting element 330 and receive the sensing signal SLD; and the positive input terminal of the comparator CMP1 may receive the reference voltage VREF. The reference voltage generator 341 receives a voltage VCC and is coupled to the output terminal of the comparator CMP1 and the positive input terminal thereof. The reference voltage generator 341 generates the reference voltage VREF according to the voltage VCC and the output voltage of the comparator CMP.

The comparator CMP1 may be implemented using an operational amplifier. The comparator CMP1 receives the power supply voltage +VCC and the reference ground voltage VSS as the operating power supply. In particular, the reference ground voltage VSS may be a voltage of 0 volts. In the present embodiment, the signal processor 340 may generate the light sensing information VSO of logic value of 0 or 1, for example.

The reference voltage generator 341 includes resistors R3 and R4. One end of the resistor R3 receives the voltage VCC, and another end of the resistor R3 is coupled to the positive input terminal of the comparator CMP1 to generate the reference voltage VREF. The resistor R4 is coupled between the resistor R3 and the output terminal of the comparator CMP1. In the present embodiment, when the reference voltage VREF is greater than the sensing signal SLD, the signal processor 340 may generate the light sensing information VSO of logic value 1; correspondingly, when the reference voltage VREF is not greater than the sensing signal SLD, the signal processor 340 may generate the light sensing information VSO of logic value 0.

Figure 4:
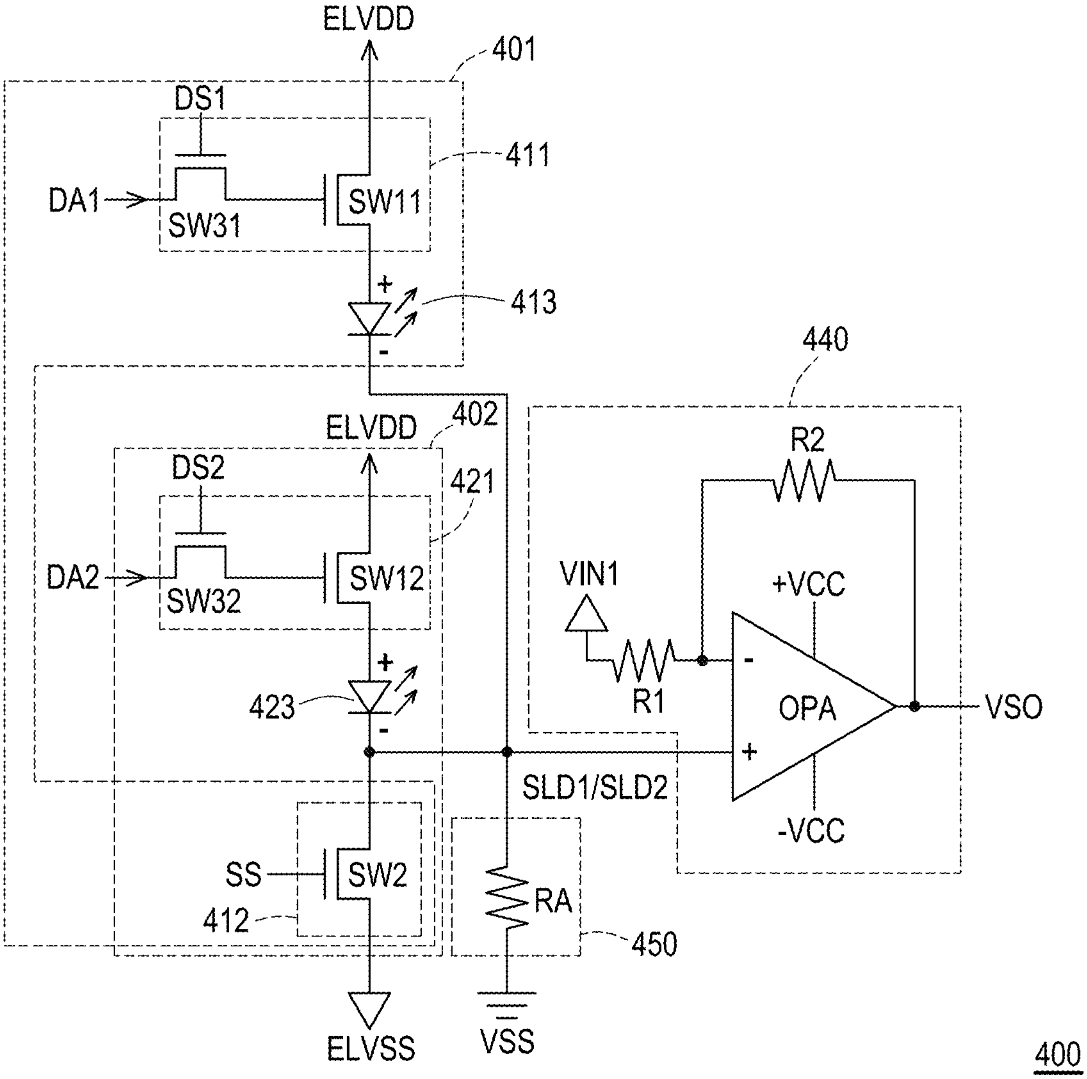
FIG. 4 shows a schematic diagram of a display panel of an embodiment of the invention.

Referring to FIG. 4 below, FIG. 4 shows a schematic diagram of a display panel of an embodiment of the invention. A display panel 400 includes a plurality of pixel circuits 401 and 402. In the present embodiment, the pixel circuits 401 and 402 are disposed on the same display column. The pixel circuit 401 includes a driving circuit 411, a light-emitting element 413, a selection circuit 412, a signal processor 440, and a current-to-voltage converter 450. The pixel circuit 402 includes a driving circuit 421, a light-emitting element 423, a selection circuit 412, a signal processor 440, and a current-to-voltage converter 450. In particular, the pixel circuits 401 and 402 share the same selection circuit 412, signal processor 440, and current-to-voltage converter 450.

In the present embodiment, the driving circuit 411 includes switches SW11 and SW31, and the driving circuit 421 includes switches SW12 and SW32. The switches SW31 and SW32 are controlled by the scan signals GS1 and GS2 respectively. The scan signals GS1 and GS2 may be enabled in different first time interval and second time interval, respectively, and the data signals DA1 and DA2 may be transmitted to the light-emitting elements 413 and 423 in the first time interval and the second time interval, respectively. In the light-emitting mode, the shared selection circuit 412 may be turned on according to the selection signal SS in the first time interval and the second time interval. In this way, the light-emitting elements 413 and 423 may emit light according to the data signals DA1 and DA2 respectively in a time-sharing manner. In the light-sensing mode, the shared selection circuit 412 may be turned off according to the selection signal SS in the first time interval and the second time interval. The light-emitting element 413 may cooperate with the current-to-voltage converter 450 to generate a sensing signal SLD1 in the first time interval according to the sensing light signal. The light-emitting element 423 may cooperate with the current-to-voltage converter 450 to generate another sensing signal SLD2 in the second time interval according to the sensing light signal.

The signal processor 440 may receive the sensing signals SLD1 and SLD2 in a time-sharing manner, and perform a signal processing operation on the sensing signals SLD1 and SLD2 to generate the light signal sensing information VSO.

In the present embodiment, the circuit configuration and the operation details of the current-to-voltage converter 450 and the signal processor 440 are similar to those of the current-to-voltage converter 250 and the signal processor 240 of the above embodiments, and are not further described herein.

It is worth mentioning that, in the present embodiment, the display panel 400 may include a plurality of pixel circuits arranged in a pixel array. The two pixel circuits 401 and 402 shown in the figures are merely examples for illustration and are not intended to limit the scope of implementation of the invention. Moreover, the plurality of pixel circuits 401 and 402 in the same display column may be implemented by sharing the selection circuit 412, the signal processor 440, and the current-to-voltage converter 450 as shown in the figures to save circuit area. Or, in other embodiments of the invention, the method may be implemented by only sharing a portion of the selection circuit 412, the signal processor 440, and the current-voltage converter 450, or not sharing the selection circuit 412, the signal processor 440, and the current-voltage converter 450 at all, and there are no specific restrictions.

Figure 5A:
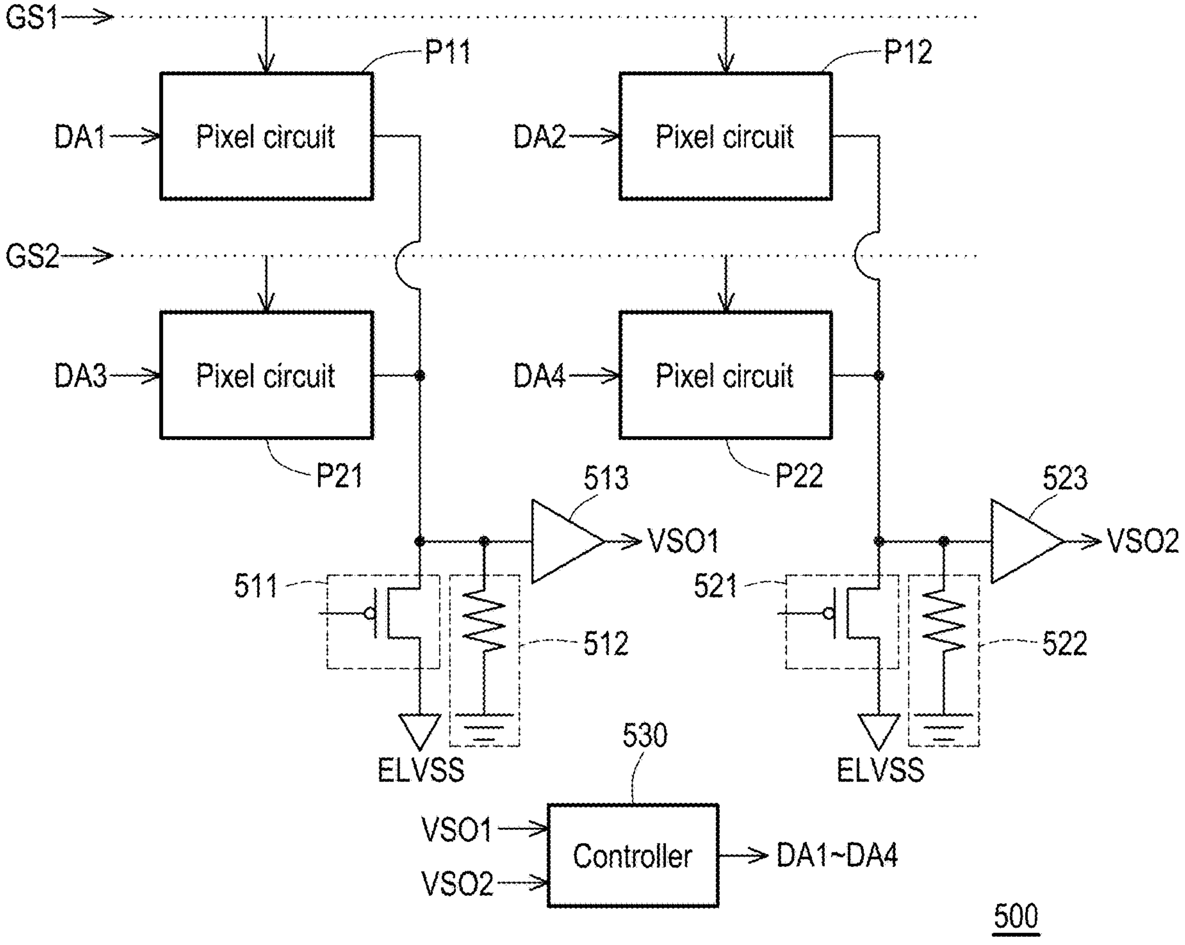
FIG. 5A shows a schematic diagram of a display panel of an embodiment of the invention.

Referring to FIG. 5A below, FIG. 5A shows a schematic diagram of a display panel of an embodiment of the invention. A display panel 500 includes a plurality of pixel circuits P11 to P22 and a controller 530. The pixel circuits P11 to P22 are arranged in a pixel array, wherein the pixel circuits P11 and P21 are arranged in the same first display column, and the pixel circuits P12 and P22 are arranged in the same second display column; the pixel circuits P11 and P12 are arranged in the same first display row, and the pixel circuits P21 and P22 are arranged in the same second display row.

In the present embodiment, the pixel circuits P11 and P21 may share the same selection circuit 511, current-to-voltage converter 512, and signal processor 513. The pixel circuits P12 and P22 may share the same selection circuit 521, current-to-voltage converter 522, and signal processor 523. In addition, the pixel circuits P11 and P12 receive the same scan signal GS1, and the pixel circuits P21 and P22 receive the same scan signal GS2.

The controller 530 is coupled to the signal processors 513 and 523 and used for receiving light sensing information VSO1 and VSO2 generated by the signal processors 513 and 523 to obtain the position on the touch panel 500 irradiated by the external light signal. Correspondingly, the controller 510 may generate corresponding data signals DA1 to DA4 according to the light sensing information VSO1 and VSO2, and transmit the data signals DA1 to DA4 to the pixel circuits P11 to P22 irradiated by the external light signal. In the display mode, the pixel circuits P11 to P22 irradiated by the external light signal are made to display at high luminance, for example, and the correspondingly illuminated light-emitting elements are adjusted.

Figure 5B:
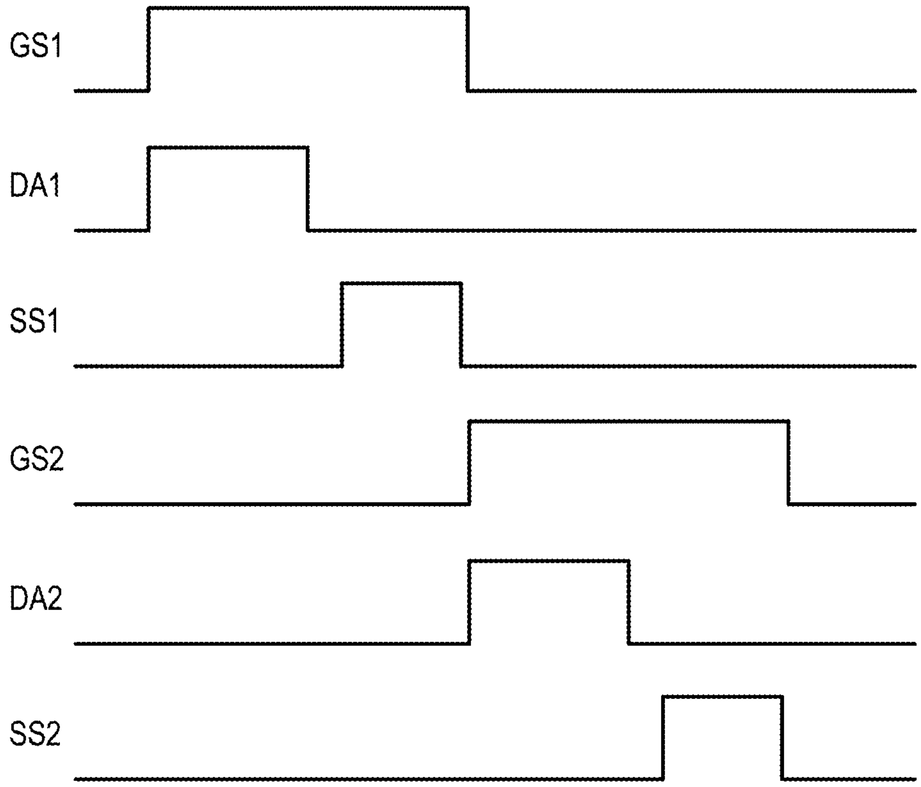
FIG. 5B is an operation waveform diagram of a display panel of an embodiment of the invention.

For details of the operation of the display panel 500, reference may be made to the operation waveform diagram of the display panel of the embodiment of the invention of FIG. 5B. In FIG. 5B, the scan signal GS1 may be first enabled (pulled up to a relatively high voltage value) to drive the pixel circuits P11 and P12 to perform a data writing operation. At the same time, the data signal DA1 may be written into the pixel circuits P11 and P12. After the data writing operation of the pixel circuits P11 and P12 is completed, while the scan signal GS1 is still enabled, the selection signal SS1 may be enabled, and the switch in the selection circuit 511 shared by the pixel circuits P11 and P21 is turned off to enter the light-sensing mode. The current-to-voltage converter 512 and the signal processor 513 correspondingly execute related actions in the light-sensing mode.

Next, the scan signal GS2 may be first enabled (pulled up to a relatively high voltage value) to drive the pixel circuits P21 and P22 to perform a data writing operation. At the same time, the data signal DA2 may be written into the pixel circuits P21 and P22. After the data writing operation of the pixel circuits P21 and P22 is completed, while the scan signal GS2 is still enabled, the selection signal SS2 may be enabled, and the switch in the selection circuit 521 shared by the pixel circuits P21 and P22 is turned off to enter the light-sensing mode. The current-to-voltage converter 522 and the signal processor 523 correspondingly execute related actions in the light-sensing mode.

Figure 6A:
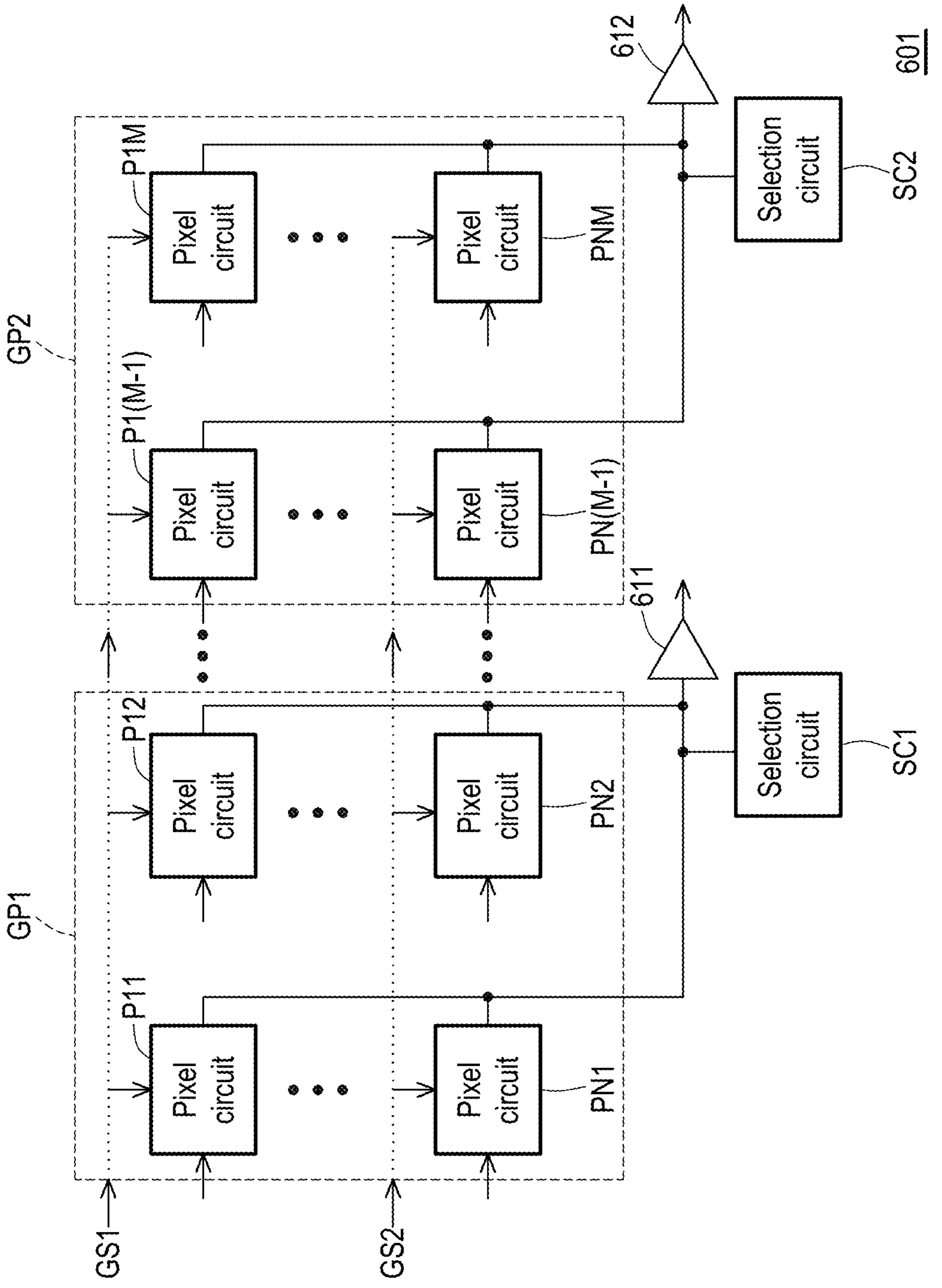
FIG. 6A and FIG. 6B respectively show schematic diagrams of display panels of different embodiments of the invention.
Figure 6B:
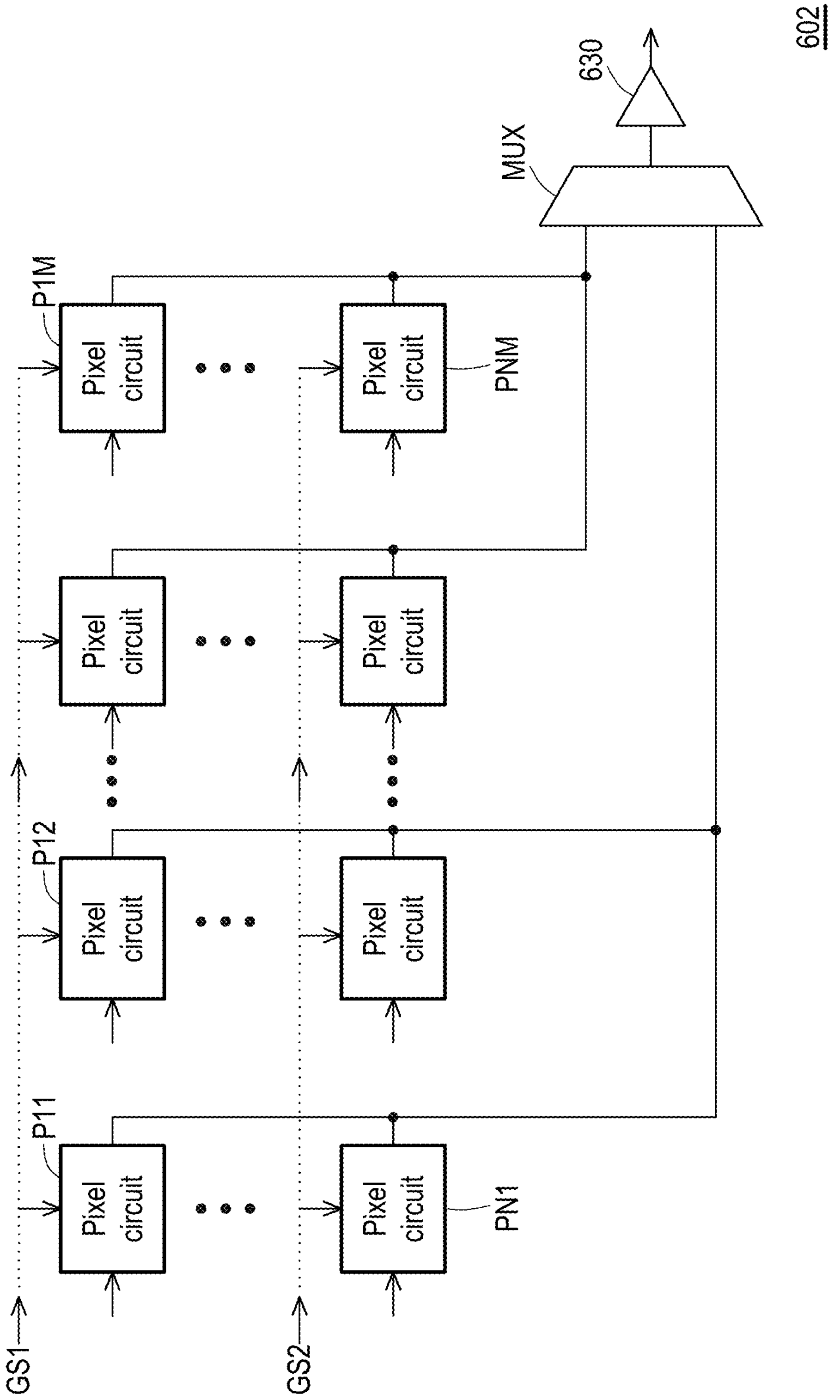

Referring to FIG. 6A and FIG. 6B below, FIG. 6A and FIG. 6B respectively show schematic diagrams of display panels of different embodiments of the invention. In FIG. 6A, a display panel 601 includes a plurality of pixel circuits P11 to PNM. The pixel circuits P11 to PNM are arranged into a pixel array. In particular, the pixel circuits P11 to P1M receive the scan signal GS1, and the pixel circuits PN1 to PNM receive the scan signal GS2. In the present embodiment, the pixel array may be divided into a plurality of pixel partitions GP1 and GP2. The pixel circuits P11 to PN2 in the pixel partition GP1 may share the same selection circuit SC1 and signal processor 611. Pixel circuits PN(M−1) to PNNM in the pixel partition GP2 may share the same selection circuit SC2 and signal processor 612.

Each of the pixel circuits P11 to PNM may be implemented by applying each of the pixel circuits of the above plurality of embodiments.

Incidentally, in the present embodiment, there is no specific limit on the number of pixel partitions divided in the display panel 601, and there is also no specific limit on the number of pixel circuits in each of the pixel partitions. Designers may set the pixel partitions and the number of pixel circuits in each of the pixel partitions according to actual needs.

In FIG. 6B, the display panel 601 includes the plurality of pixel circuits P11 to PNM. The pixel circuits P11 to PNM may be all of the pixel circuits on the display panel 601, or pixel circuits in one pixel partition of the display panel 601. The pixel circuits P11 to PNM are arranged in an array, wherein the pixel circuits P11 to P1M receive the same scan signal GS1, and the pixel circuits PN1 to PNM receive the same scan signal GS2.

It is worth noting that, in the present embodiment, the display panel 602 further includes a multiplexer MUX. In particular, the pixel circuits P11 to P1M of the present embodiment share a same signal processor 630. The multiplexer MUX is coupled between the pixel circuits P11 to P1M and the signal processor 630. The multiplexer MUX may select each sensing signal generated by the pixel circuits P11 to P1M in a time-sharing manner to transmit the sensing signal to the signal processor 630, and enable the signal processor 630 to generate corresponding light sensing information in a time-sharing manner.

Figure 7:
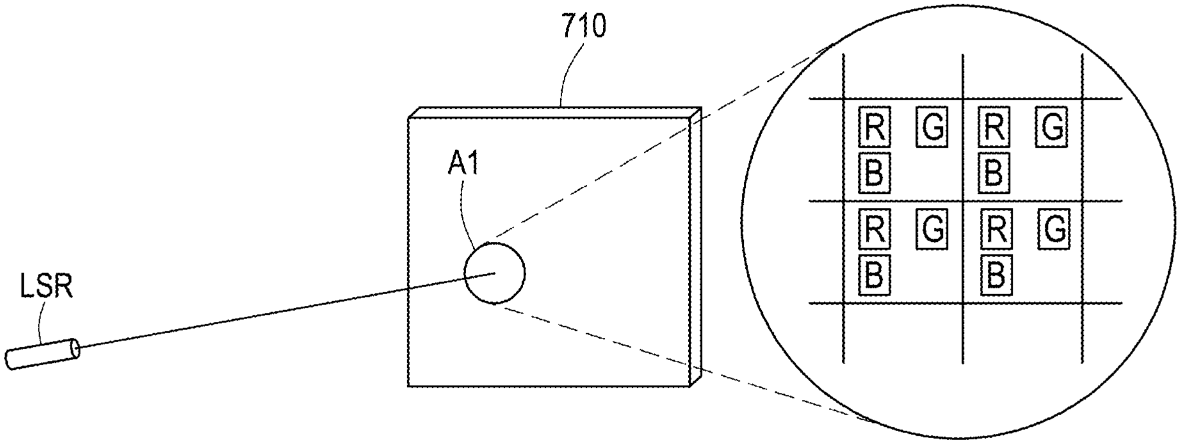
FIG. 7 shows a schematic diagram of an application example of a display panel of an embodiment of the invention.

Referring to FIG. 7 below, FIG. 7 shows a schematic diagram of an application example of a display panel of an embodiment of the invention. In FIG. 7, a laser device LSR may be used to generate a light signal, wherein the laser device LSR may be a laser pen having better collimation and emits the light signal to an area A1 on a display panel 710. On the display panel 710, there are a plurality of pixel circuits R, G, B including light-emitting elements emitting red light, blue light, and green light to form a pixel array. During the light sensing period, the pixel circuits R, G, and B in the area A1 sense the intensity of the light signal and may know the area A1 irradiated by the light signal. Furthermore, in the light-emitting mode, the display panel 710 may make the pixel circuits R, G, and B in the area 710 emit light to act in correspondence to the light signal indication of the laser device LSR. In an embodiment not shown, it is not necessary for all the light-emitting elements in the pixel circuits R, G, and B to be used for light sensing and light emission at the same time. Any light-emitting element in the pixel circuits R, G, and B may be selected to be used for light sensing and light emission at the same time. It is particularly noted that the laser device LSR may be replaced by other elements that may generate a light signal, such as a light-emitting diode (LED) having more uniform light distribution, as long as these elements may generate enough light intensity to project onto the display panel and provide the desired light signals for sensing. The wavelength of the laser device may be shorter than that of the LED, and has a better reflection response.

Figure 8A:
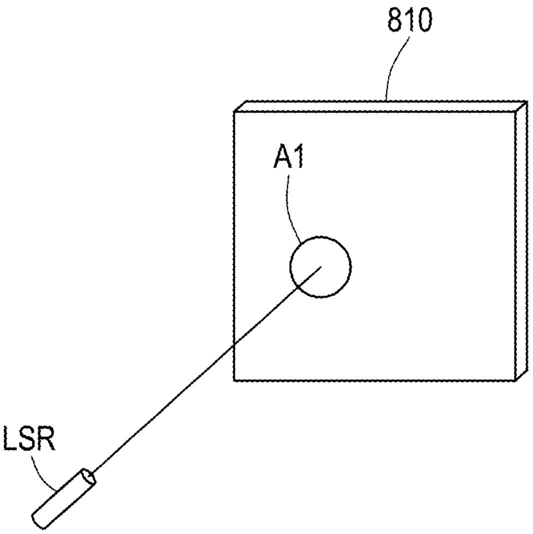
FIG. 8A and FIG. 8B show schematic diagrams of different application examples of a display panel of an embodiment of the invention.
Figure 8B:
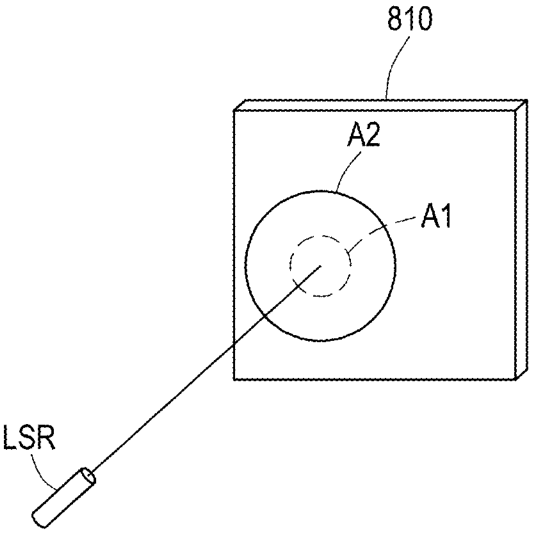

Please refer to FIG. 8A and FIG. 8B below. FIG. 8A and FIG. 8B show schematic diagrams of different application examples of the display panel of an embodiment of the invention. In FIG. 8A, a display panel 810 may generate a corresponding luminance display in the area A1 corresponding to the position of the laser device LSR projecting the light signal. In FIG. 8B, when the intensity of the light signal projected by the laser device LSR is increased, the display panel 810 may expand the light-emitting area A1 to the area A2 in response to the intensity of the light signal. In other words, in an embodiment of the invention, the display panel 810 may increase or decrease the area providing high-luminance display according to the intensity of the light signal projected by the laser device LSR to enhance the interactive experience between the user and the display panel 810.

Figure 9:
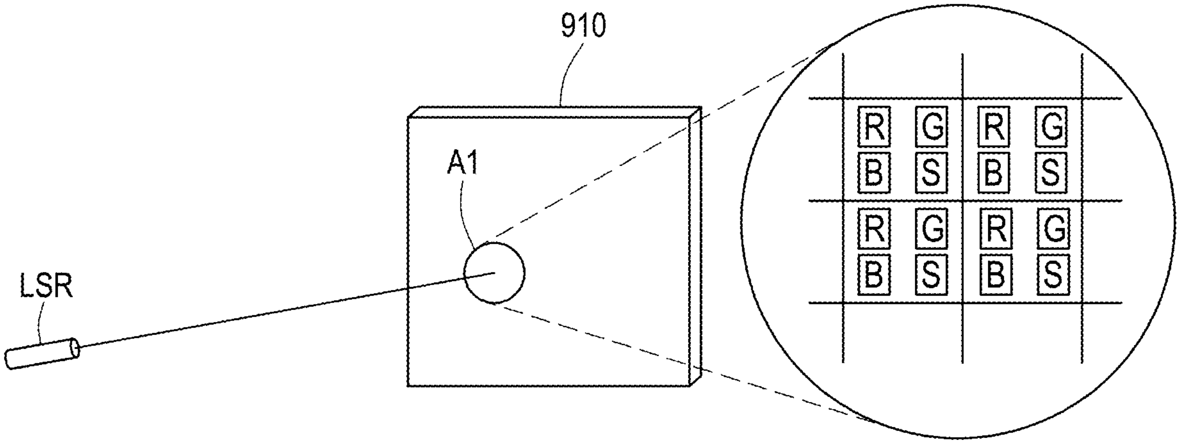
FIG. 9 shows a schematic diagram of a display panel of another embodiment of the invention.

Referring to FIG. 9, FIG. 9 shows a schematic diagram of a display panel of another embodiment of the invention. A display panel 910 may include a photodiode S in addition to the pixel circuits R, G, B of light-emitting elements for emitting red light, blue light, and green light. The photodiode S may be a PN-type photodiode or a PIN-type photodiode. Thereby, the density of the light signal sensing elements per unit area in the display panel 910 may be increased to improve the sensitivity of light signal sensing.

Based on the above, the pixel circuit of the invention senses an external light signal via a light-emitting element in a light-sensing mode to generate light sensing information. Furthermore, in the light-emitting mode, the pixel circuit may emit light according to the light sensing information. In this way, the user may interact with the display panel by emitting a light signal to the display panel, thereby effectively improving the working performance of the display panel.

What is claimed is:

1. A pixel circuit, comprising:

a driving circuit coupled to a power supply voltage and controlled by a data signal;

a selection circuit turned on or off according to a mode of the pixel circuit;

a light-emitting element coupled between the driving circuit and the selection circuit, and generating a sensing signal by sensing a luminance of a light signal in a light-sensing mode; and a signal processor coupled to the light-emitting element and generating light sensing information according to the sensing signal and a reference voltage.

2. The pixel circuit of claim 1, wherein an anode of the light-emitting element is coupled to the driving circuit, and a cathode of the light-emitting element is coupled to the selection circuit, and in the light-sensing mode, the light-emitting element generates a sensing current by sensing the luminance of the light signal.

3. The pixel circuit of claim 2, further comprising:

a current-to-voltage converter coupled between the cathode of the light-emitting element and a first voltage, and the current-to-voltage converter generates the sensing signal as a voltage signal according to the sensing current.

4. The pixel circuit of claim 3, wherein the signal processor comprises:

an operational amplifier having a positive input terminal for receiving the sensing signal; and a feedback circuit coupled between an output terminal of the operational amplifier and a negative input terminal of the operational amplifier, and generating the reference voltage according to an output voltage of the operational amplifier and a second voltage.

5. The pixel circuit of claim 4, wherein the feedback circuit comprises:

a first resistor and a second resistor, wherein the first resistor is coupled between the negative input terminal of the operational amplifier and an input voltage, and the second resistor is coupled between the first resistor and the output terminal of the operational amplifier.

6. The pixel circuit of claim 1, wherein an anode of the light-emitting element is coupled to the driving circuit, and a cathode of the light-emitting element is coupled to the selection circuit, and in the light-sensing mode, by sensing the luminance of the light signal, the anode of the light-emitting element generates the sensing signal as a voltage signal.

7. The pixel circuit of claim 6, wherein the signal processor comprises:
a comparator having a negative input terminal coupled to the cathode of the light-emitting element to receive the sensing signal;
a reference voltage generator coupled to a positive input terminal of the comparator and an output terminal of the comparator, and the reference voltage generator generates the reference voltage according to a first voltage and an output voltage of the comparator.

8. The pixel circuit of claim 7, wherein the reference voltage generator comprises a first resistor and a second resistor, one end of the first resistor receives the first voltage, another end of the first resistor is coupled to the positive input terminal of the comparator, and the second resistor is coupled between the first resistor and the output terminal of the comparator.

9. The pixel circuit of claim 1, wherein the driving circuit comprises a first switch, the selection circuit comprises a second switch, one end of the first switch receives the power supply voltage, another end of the first switch is coupled to the light-emitting element; the second switch is coupled between the light-emitting element and a reference ground voltage.

10. The pixel circuit of claim 9, wherein in the light-sensing mode, the first switch is turned on, and the second switch is turned off; in a light-emitting mode, both the first switch and the second switch are turned on.

11. The pixel circuit of claim 9, wherein the driving circuit further comprises a third switch, the third switch receives the data signal and provides the data signal to a control terminal of the first switch according to a scan signal.

12. A display panel, comprising:
a plurality of pixel circuits arranged in a pixel array, each of the pixel circuits comprising:
a driving circuit coupled to a power supply voltage and controlled by a data signal;
a selection circuit turned on or off according to a mode of the pixel circuit;
a light-emitting element coupled between the driving circuit and the selection circuit, and generating a sensing signal by sensing a luminance of a light signal in a light-sensing mode; and
a signal processor coupled to the light-emitting element and generating light sensing information according to the sensing signal and a reference voltage.

13. The display panel of claim 12, wherein the pixel array is divided into a plurality of pixel partitions, and the pixel circuits in each of the pixel partitions share at least one of a same selection circuit and signal processor.

14. The display panel of claim 12, wherein the pixel array is divided into a plurality of pixel columns, and the pixel circuits in each of the pixel columns share the same signal processor.

15. The display panel of claim 12, wherein the pixel array is divided into a plurality of pixel partitions, the pixel circuits in the pixel partitions share a same signal processor, and the display panel further comprises:
a plurality of multiplexers, wherein each of the multiplexers is respectively coupled between the light-emitting elements of each of the corresponding pixel partitions and each of the corresponding signal processors to select one of the sensing signals in each of the pixel partitions to each of the corresponding signal processors.

16. The display panel of claim 12, wherein the pixel circuits share a same signal processor, and the display panel further comprises:
a multiplexer coupled between each of the light-emitting elements of each of the pixel circuits and the signal processor for selecting one of the sensing signals to the signal processor.

17. The display panel of claim 12, further comprising:
a controller receiving each of the light sensing information of each of the pixel circuits and generating each of the data signals corresponding to each of the pixel circuits according to the light sensing information.

18. The display panel of claim 13, wherein the controller adjusts a number of illuminated pixel circuits in a light-emitting mode according to the light sensing information.

19. The display panel of claim 12, wherein each of the pixel circuits further comprises:
a photodiode coupled to the light-emitting element in each of the pixel circuits, and the photodiode is used to sense an intensity of the light signal.

* * * * *